UNITED STATES PATENT OFFICE.

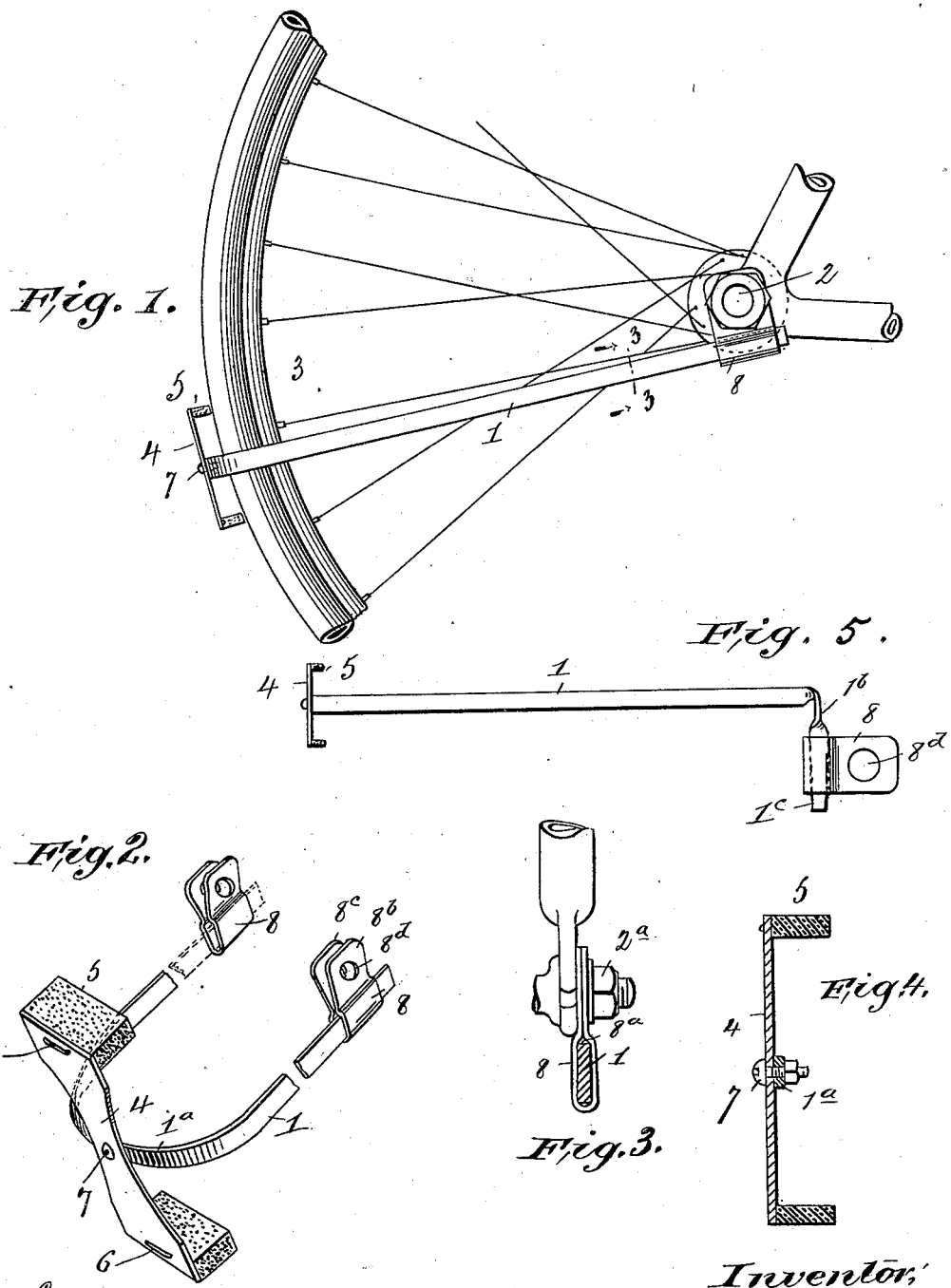

JAMES B. HIXON, JR., OF NEW YORK, N. Y.

MUD-GUARD.

SPECIFICATION forming part of Letters Patent No. 671,320, dated April 2, 1901.

Application filed February 21, 1900. Serial No. 6,028. (No model.)

*To all whom it may concern:*

Be it known that I, JAMES B. HIXON, Jr., a citizen of the United States, residing at New York city, borough of Manhattan, State of New York, have invented certain new and useful Improvements in Mud-Guards, of which the following is a specification.

The object of my invention is to provide a simple and convenient mud-guard for wheels which will act efficiently to prevent mud, water, and the like from flying upwardly from the wheel.

The invention consists in the novel details of improvement that will be more fully hereinafter set forth and then pointed out in the claims.

Reference is to be had to the accompanying drawings, forming part hereof, wherein—

Figure 1 is a side elevation of a portion of a wheel, showing my improved mud-guard applied thereto. Fig. 2 is a partly-broken perspective view of the mud-guard, having the stay in two substantially parallel arms. Fig. 3 is a cross-section on the line 3 3 in Fig. 1. Fig. 4 is a detail section of the guard, and Fig. 5 is a detail of a modification.

In the accompanying drawings, in which similar numerals of reference indicate corresponding parts in the several views, 1 indicates a stay or support which is preferably in the form of a flat bar having its narrow edge turned upwardly and adapted to extend from the shaft or axle 2 of a wheel 3 to a point beyond the periphery of the wheel or its tire. To the stay 1 is connected the mud-guard, which comprises an upwardly-extending resilient support or web 4 and a projection or pad 5, attached thereto and extending toward the periphery of the wheel. I preferably form the support 4 of flexible rubber or rubber cloth and the pad 5 of felt and secure the latter to the former by any suitable means— as, for instance, by a staple or wire 6 passing through said parts. The support 4 and its pad 5 may extend above or below the stay 1 only or on both sides of the latter, in which case a pad will be at or near each end of the support, as shown in the drawings. I have shown the stay 1 as arranged to extend substantially parallel to the wheel from a point adjacent to the axle 2, and at a point near or beyond the periphery of the wheel the stay is bent laterally at $1^a$, transversely of the wheel, to which part $1^a$ the support 4 is attached, as by a screw 7 or by any other suitable means. By means of the screw 7 the mud-guard can be removed from the stay and another one replaced in case of necessity. The location of the pad 5 relatively to the periphery of the wheel or its tire is preferably such that the pad will be almost in contact with said periphery, and by means of the resilient support 4 the pad can follow the inequalities of the periphery of the wheel or tire while remaining in close proximity thereto. The mud, water, or the like that is carried around by the wheel will be engaged by the pad and will thereby be prevented from being thrown forcibly outwardly, and will be obstructed from following the periphery of the wheel or rim, more or less, beyond the pad in the direction of rotation of the wheel.

While the stay 1 may be in a single strand of metal, I find it advantageous to bend the same outside of the periphery of the rim or tire of the wheel into two substantially parallel arms and to attach the support 4 at a central position, as indicated in Fig. 2.

Any suitable means may be provided for attaching the stay 1 to the shaft or axle 2 of the wheel. I have shown clips 8 for this purpose, which are indicated in the form of strips of metal bent to form a socket $8^a$ to receive the stay and provided with two parallel arms or webs $8^b$ $8^c$, extending therefrom and provided with opposed apertures $8^d$ to receive the axle or shaft 2, and the width of the socket relatively to the bent portions of the clip is such that the arms $8^b$ $8^c$ when clamped between a nut and an opposed abutment will draw the walls of the clip at the socket $8^a$ firmly against the stay 1, so as to grip the same to hold it from longitudinal movement. The nut holds the clip from rotation, and the clip and the stay can be adjusted to any desired angle and firmly secured in place. To remove or replace the stay from the clip, it is simply necessary to loosen the nut, so that the arms $8^b$ $8^c$ can expand to enlarge the cross-section of socket $8^a$, whereupon the stay will be free to slide in or out therefrom.

While in Figs. 1 and 2 the socket $8^a$ is shown extending parallel to the length of stay 1, it is evident that the socket $8^a$ and clip can extend at an angle to each other. Such an arrangement is shown in Fig. 5, in which the stay 1, near its free end, is bent at an angle to its main body portion, as at 1$^b$, forming a projection 1$^c$, and the socket 8$^a$ and projection 1$^c$ will be preferably made downwardly tapering, so that the socket may remain in position, and whereby the stay can be detached and attached by pulling the projection 1$^c$ outwardly or pushing it downwardly.

By making the pad 5 of felt heat which would arise from the frictional contact with the tire is reduced to a minimum or prevented and the felt is not liable to wear or to cause wear on the tire to the extent that would occur if the pad were made of metal, rubber, or other material not having the characteristics of felt.

Having now described my invention, what I claim is—

1. A mud-guard comprising a stay, a support attached thereto composed of a resilient strip extending substantially perpendicularly to the plane of the stay, and a pad or projection secured to the inner face of the support and projecting toward the periphery of a wheel or tire, substantially as described.

2. A mud-guard comprising a stay adapted to extend substantially parallel to a wheel and having a bent portion near its outer end, a support attached thereto composed of a resilient strip extending vertically relatively to the stay, a pad of felt extending from said support toward the periphery of a wheel, and means for attaching the stay to a shaft or axle, substantially as described.

3. The combination with a stay having a support extending substantially tangentially to a wheel and provided with a pad or projection adapted to aline with the periphery of a wheel or rim, of a clip comprising a bent strip having a socket to receive the stay, the socket being of greater area than the part of the stay it receives, and a pair of opposed arms adapted when clamped together to cause the walls of the socket to close upon and firmly grip the stay, substantially as described.

4. The combination of a stay provided with a guard to aline with the periphery of a wheel, with a clip comprising a bent strip having walls forming a socket to receive the stay, the area of the socket being greater than the part of the stay that enters it, and also having a pair of opposed arms normally spread apart to be pressed together when clamped on the axle to draw the opposed walls of the socket toward the stay to firmly grip the stay, substantially as described.

JAMES B. HIXON, JR.

Witnesses:
T. F. BOURNE,
F. E. TURNER.